United States Patent [19]

Streefkerk et al.

[11] Patent Number: 6,104,470
[45] Date of Patent: Aug. 15, 2000

[54] PRINTING SYSTEM AND CONTROL UNIT UTILIZING A VISUAL REPRESENTATION OF A SHEET OR DOCUMENT FOR SELECTING DOCUMENT-FINISHING OPERATIONS

[75] Inventors: Abraham J. Streefkerk, Amstelveen; André M. M. Verhaegh, Eindhoven; Robertus C. W. T. M. van den Tillaart, Gemert, all of Netherlands

[73] Assignee: Océ-Technologies B.V., Ma Venlo, Netherlands

[21] Appl. No.: 09/108,307

[22] Filed: Jul. 1, 1998

[30] Foreign Application Priority Data

Jul. 4, 1997 [NL] Netherlands ............ 1006469

[51] Int. Cl.[7] .............. G03B 27/52; H04N 1/00; B41J 15/00
[52] U.S. Cl. .............. 355/40; 358/401; 395/114
[58] Field of Search ............ 355/40, 38, 54, 355/64; 399/81, 361, 8; 395/326, 112, 111, 114, 115, 101; 358/401, 468

[56] References Cited

U.S. PATENT DOCUMENTS

| | | | |
|---|---|---|---|
| 5,717,501 | 2/1998 | Iwamoto et al. | 358/465 |
| 5,881,212 | 3/1999 | Morita | 395/112 |
| 5,907,669 | 5/1999 | Yoshiura et al. | 395/115 |

FOREIGN PATENT DOCUMENTS

| | | |
|---|---|---|
| 10-331329 | 9/1989 | European Pat. Off. . |
| 20-595387 | 5/1994 | European Pat. Off. . |
| 30-595387 | 5/1994 | European Pat. Off. . |
| 10-656581 | 6/1995 | European Pat. Off. . |

*Primary Examiner*—Russell Adams
*Assistant Examiner*—Peter B. Kim

[57] ABSTRACT

A printing system including at least one printer for printing images on sheets in accordance with electrical image signals and control signals fed to the printer, a control unit for feeding electrical image and control signals to the at least one printer, and an input unit for receiving and feeding the electrical image signals to the control unit. The control unit includes an operating unit for generating control signals relating to a document-finishing operation on sheets for printing by the at least one printer and a display unit adapted to display operating information. The display unit displays a visual representation of a sheet or document in accordance with more than one selectable document-finishing operation by utilizing a single, adaptable visual representation. This adaptable visual representation is provided with selection areas which represent selectable document-finishing operations. A document-finishing operation can be selected by activating an associated selection area. The visual representation of the sheet or document is continuously adapted or updated to reflect a newly selected document-finishing operation.

20 Claims, 8 Drawing Sheets

FIG. 6 I
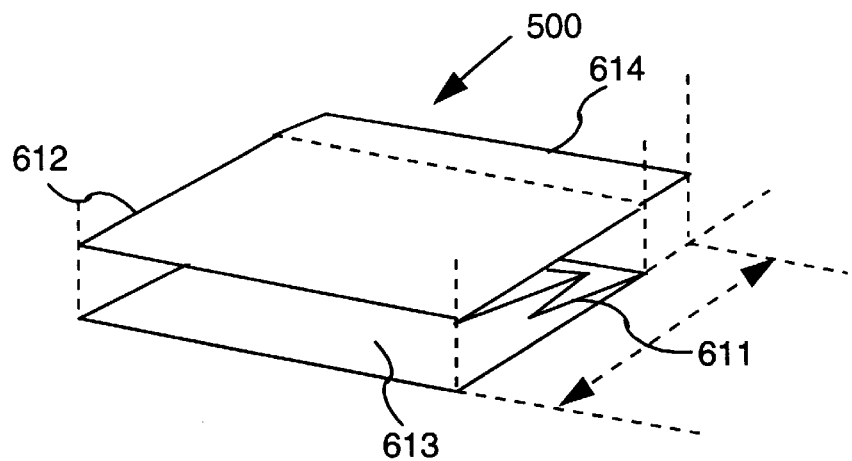
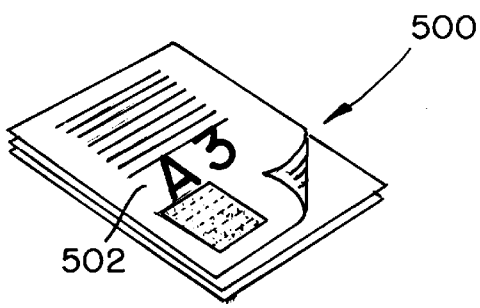
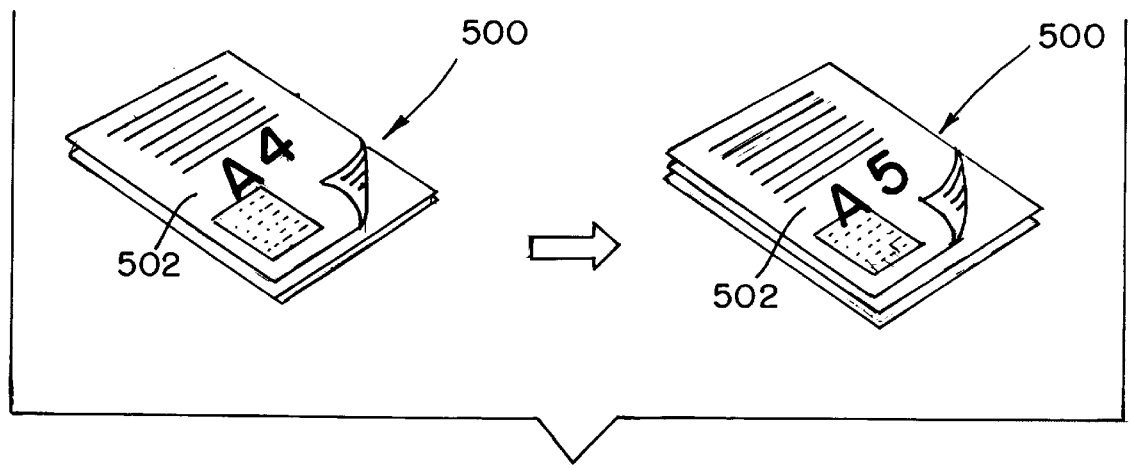
FIG. 6 J

PRINTING SYSTEM AND CONTROL UNIT UTILIZING A VISUAL REPRESENTATION OF A SHEET OR DOCUMENT FOR SELECTING DOCUMENT-FINISHING OPERATIONS

BACKGROUND OF THE INVENTION

1. Technical Field of the Invention

The invention relates to a printing system including at least one printer for printing images on sheets in accordance with electrical image and control signals fed to the printer, a control unit for feeding electrical image and control signals to the at least one printer, and an input unit for receiving and feeding the electrical image signals to the control unit. The control unit includes an operating unit for generating control signals relating to a document-finishing operation for the sheets to be printed by the at least one printer, wherein the operating unit selects a document-finishing operation to be effected by the at least one printer. A display device displays the operating information and a visual representation of a sheet or document in accordance with a selected document-finishing operation.

2. Description of Related Art

A related, convention printing system is known from European Patent Application EP 331 329, in which a copying and printing apparatus is described that is provided with a touch screen displaying various icons for selecting groups of operating functions and the operating functions themselves. By touching one of these icons, the information displayed on the touch screen is altered or the operating function associated with an icon is selected. For example, there is an icon representing a sheet reservoir. Selection of this icon results in a display on the screen of a number of different icons, each of which represents a selectable sheet reservoir. There is also an icon displaying an image of printed sheets. Selection of this icon results in the display of four different icons which represent a simplex or duplex printed sheet of an original or copy. Selection of one of these four icons results in the system being set to either simplex or duplex scanning or printing.

If there is a large number of possible functions then a large number of icons is required in this conventional system. The user is, therefore, faced with a large amount of visual information from which he must make a selection.

Another disadvantage of the conventional system is that the icons cannot all be displayed simultaneously. Thus, a user will also have to navigate between different display screens to select the desired icons. This increases the risk of the user no longer having an overview of the settings that have been made and which can still be made. In addition, navigating between different screens requires the user to carry out extra operations thereby slowing the process down and reducing efficiency.

SUMMARY OF THE INVENTION

The printing system according to the invention overcomes these disadvantages by utilizing a display unit that displays a representation of a sheet or document in accordance with more than one selectable document-finishing operation in one adaptable visual representation. This adaptable visual representation is provided with selection areas that represent selectable document-finishing operations. The operating unit permits an operator to select a document-finishing operation by activating a selection area and the display unit then displays an updated or adapted visual representation of the sheet or document in accordance with a selected document-finishing operation.

By using a single icon illustrating a symbolic display of a sheet or document, the invention enables different selectable document-finishing operations to be efficiently represented and limits the quantity of frequently unnecessarily displayed information thereby presenting a clearer interface for the user. One and the same icon can indicate whether a document is to be stapled or provided with covers, simplex or duplex printed, and portrait or landscape. Since parts of an icon are selectable, the user does not have to navigate between different icons on the same or different display screens. By additionally immediately adapting the representation of the icon according to the selected specific document-finishing operation, the user immediately gains an idea of the final document for printing, as it will look after the various selectable document-finishing operations are performed.

Another advantageous embodiment utilizes a display unit that displays a three-dimensional representation of a sheet or document in accordance with the selected document-finishing operations. The extra degree of spatial freedom means that more information can be represented. In this way, the user can also gain an idea of how a document or sheet for printing will look after the selected document-finishing operations have been carried out.

In a first embodiment, the operating unit includes an indicating device adapted to activate a selection area by indicating the same on the display unit. In addition to using a touch screen as in indicating device, it is also possible to use a digital indicator pen or a mouse-controlled cursor indication. In this way, a user selecting document-finishing operations does not need to avert his gaze from the visual representation of a sheet or document for printing and immediately obtains feedback of his selections.

In a second embodiment, the display unit is adapted to display a list of document-finishing operations for selection corresponding to an activated selection area. If the number of document-finishing operations for selection for each selection area is considerable or if these finishing operations cannot be displayed in a visually satisfactory manner or with mutual distinction, it is convenient to display a list of this kind, for example, near the selection area.

An alternative embodiment adapts the operating unit to select a document-finishing operation by repeated indication of a selection area. A toggle action of this kind can activate or deactivate a document-finishing operation or a document-finishing operation can be selected from a number of successively displayed document-finishing operations.

In this connection, another advantageous embodiment adapts the display unit to display non-selectable document-finishing operations differently in the visual representation. For example, if non-selected or non-selectable document-finishing operations are displayed in a different colour or grey or with a lighter saturation, a user immediately knows that a specific document-finishing operation has not been selected or is a possible selection.

In the case of printers that offer different document-finishing operations, one advantageous embodiment adapts the display unit to display a list of selectable printers, and the operating unit to select a printer from this list of printers. The display unit then displays a visual representation of a page or document in accordance with the selectable document-finishing operations of the selected printer. In this way a visual idea of the possibilities of a selected printer can be easily communicated to the user.

In addition to the above embodiment, a further embodiment modifies the display unit to display a list of printers adapted to finishing a page or document in accordance with the displayed document-finishing operations selected by way of the visual representation thereof.

One embodiment of a printing system utilizes selectable document-finishing operations that include simplex or duplex printing, stapling or covers, portrait or landscape format printing, and colour printing or black and white printing. These frequently required document-finishing operations are well suited to visual representation.

Further scope of applicability of the present invention will become apparent from the detailed description given hereinafter. However, it should be understood that the detailed description and specific examples, while indicating referred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A to 6J show examples the operation of the display unit in accordance with the invention as shown in FIG. 5.

DETAILED DESCRIPTION OF PREFERRED EMBODIMENTS

Figure 1:
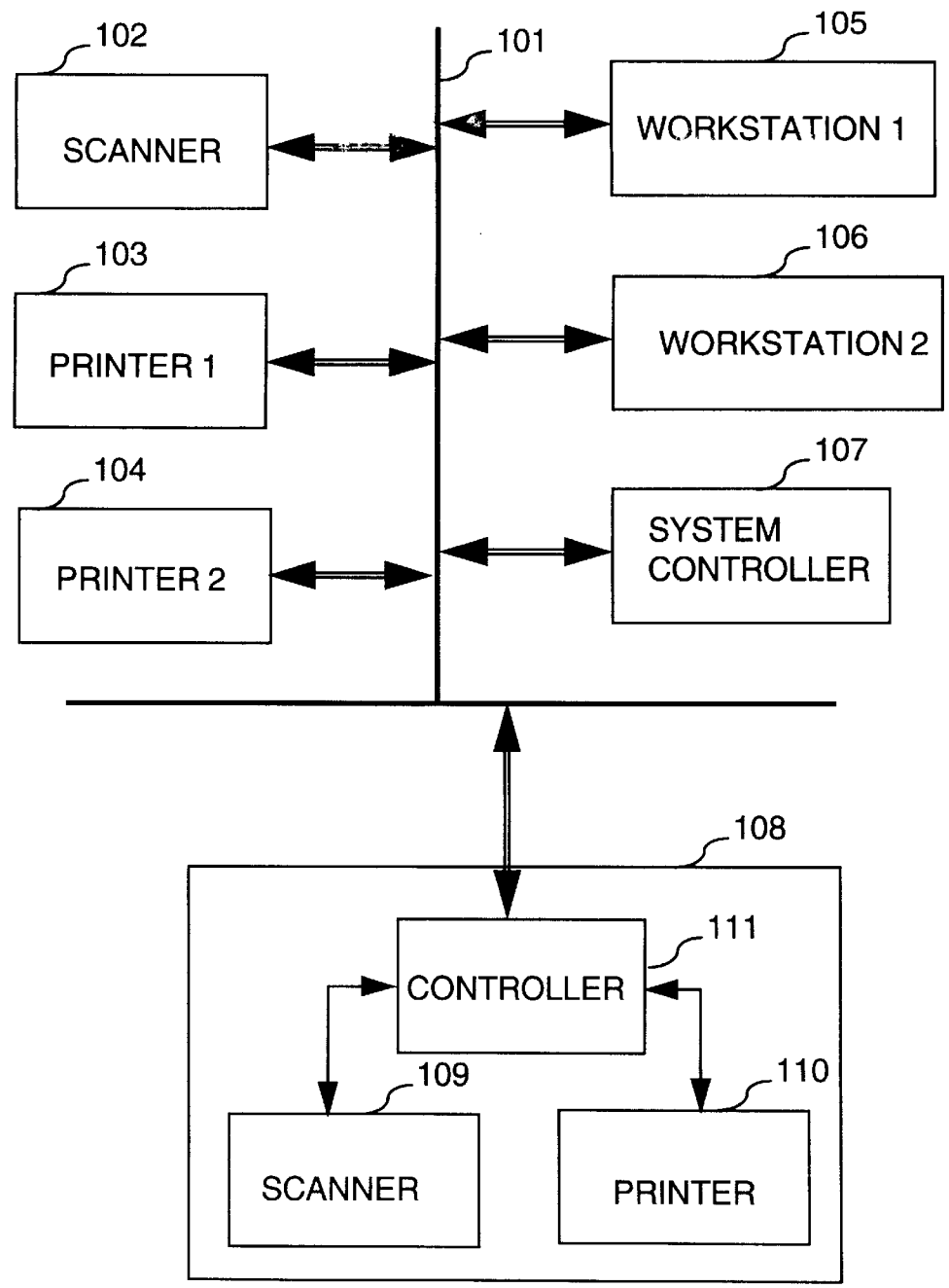
FIG. 1 is a diagram showing one possible configuration of a printing system.

FIG. 1 diagrammatically illustrates a printing system having a number of separate units interconnected by a network bus 101. The bus 101 conveys both electrical image signals and control signals between the units connected thereto. The units connected to the network bus 101 include a scanner 102, a first printer 103, a second printer 104, a first workstation 105, a second workstation 106, a system controller 107 and a combined scanner/printer combination 108.

The scanner 102 produces electrical image signals by scanning original sheets photoelectrically, for example, with a CCD array. The printers 103 and 104 are designed to print images on sheets from corresponding electrical image signals fed thereto. The printers 103 and 104 may, for example, be of the electrophotographic type with laser or LED exposure or of the inkjet type.

The workstations 105 and 106 generate electrical image signals from various programs. This may be image information generated and/or stored in a digital storage medium, a word processor, or a CAD/CAM design station, etc. Workstation users usually do not have complete control over the printing system, but they can file requests for printing electrical image signals.

A system controller 107, on the other hand, can offer a system operator the opportunity of controlling the entire printing system. The scanner/printer combination 108 also includes a scanner 109, a printer 110 and controller 111. This combination 108 can both scan and print independently of the printing system, under the control of the controller 111. Also, the combination 108 can be controlled remotely by the workstations 105 and 106 or the system controller 107 as well as be provided with electrical image signals via bus 101.

Figure 2:
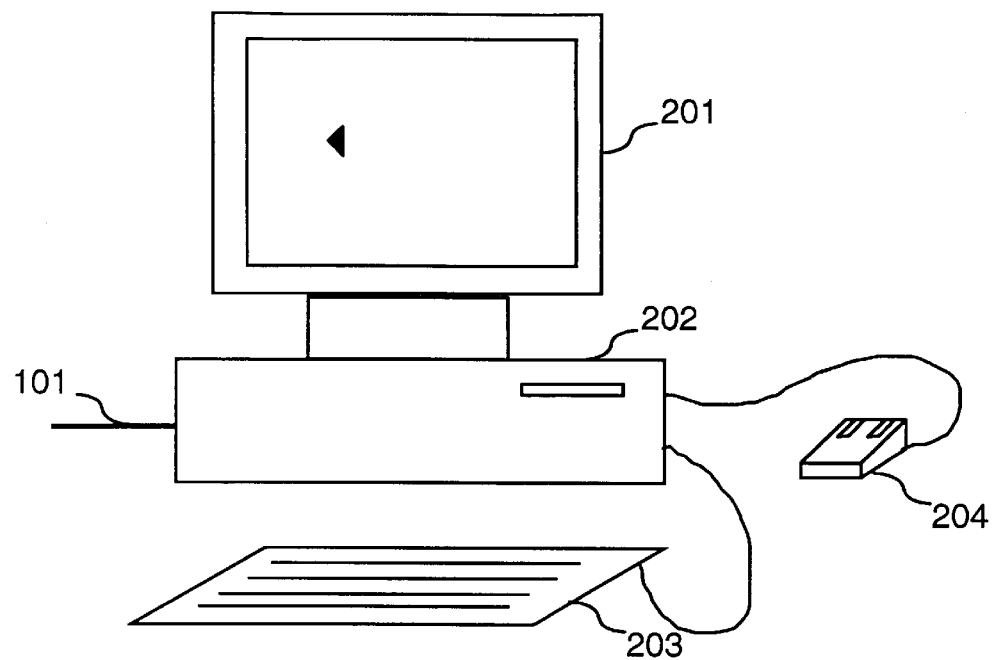
FIG. 2 shows a remote control unit for a printing system.

FIG. 2 illustrates one possible embodiment of the workstations 105 and 106 and the system controller 107. The control unit 202 connected to the network bus 101 is provided with display unit in the form of a Video Display Unit (VDU) 201 and operating unit in the form of a keyboard 203 and a mouse 204.

Figure 3:
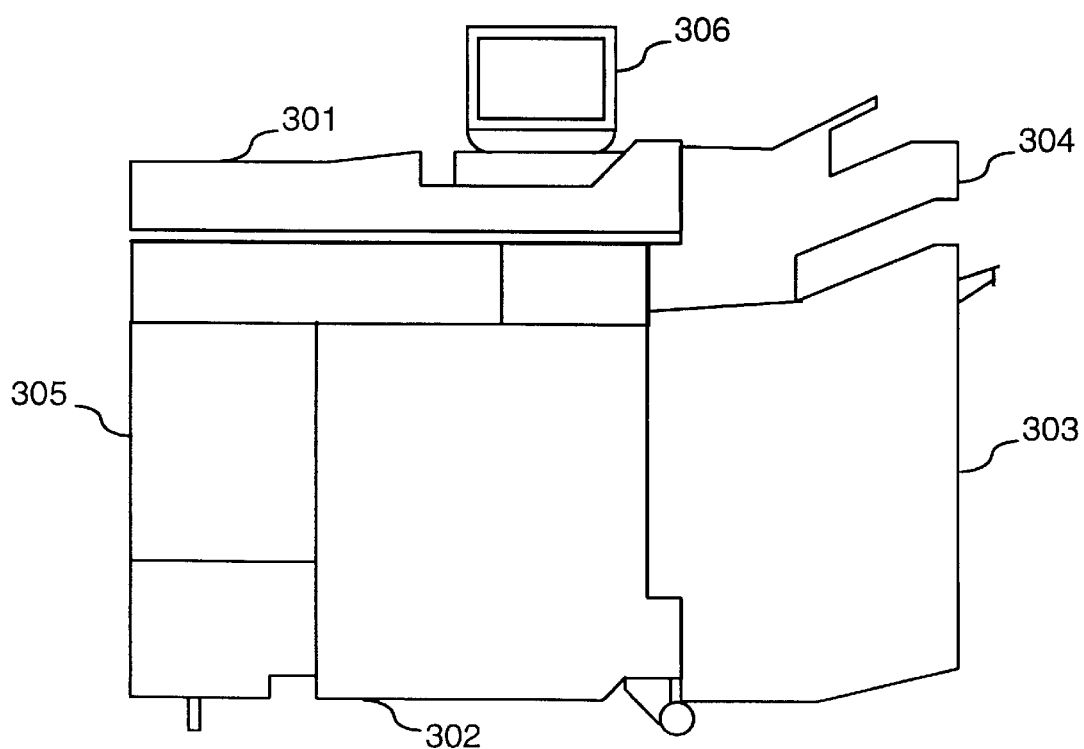
FIG. 3 shows a local control unit for a printing system.

FIG. 3 illustrates one possible embodiment of the scanner/printer combination 108. The combination 108 includes a scanner 301, a printer 302, a sheet reservoir 303, a sheet delivery module 304, control module 305 and display unit 306. The display unit includes a display device with keys (not shown in detail) for inputting operating orders.

Figure 4:
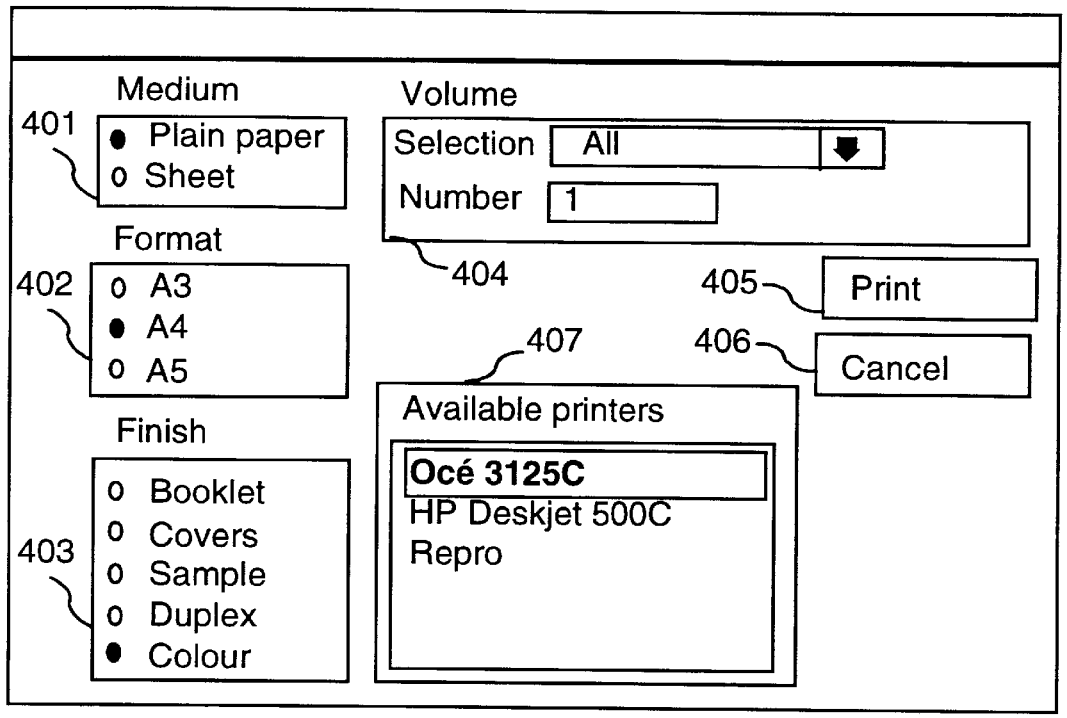
FIG. 4 shows in greater detail a conventional embodiment of a display unit and control unit of a printing system.

FIG. 4 shows in greater detail the display of the conventional display unit 201 (FIG. 2) and 306 (FIG. 3) of a control system. If the display is in the form of a CRT or LCD screen, the information displayed thereon can be selected freely. In practice, the display shown in FIG. 4 will be a specific screen from a number of possible display screens. The display shown in the drawings is presented for selecting a printer for printing a print order. The user or operator can enter what options he wishes to select with respect to a selected printer. For this purpose, the display shows an entry area 401 for the supply of plain paper or special sheets, an entry area 402 for selecting the paper format, an entry area 403 for finishing operations, an entry area 404 for the quantity of sheets to be printed, a print start area 405 and a cancel area 406. The options displayed in these areas can be selected in various ways. For example, it is possible to use a mouse-controlled cursor, keys disposed next to the screen or, in the case of a touch screen, by touching the areas themselves. The printer option area 407 shows a list of selectable printers of the printing system.

Figure 5:
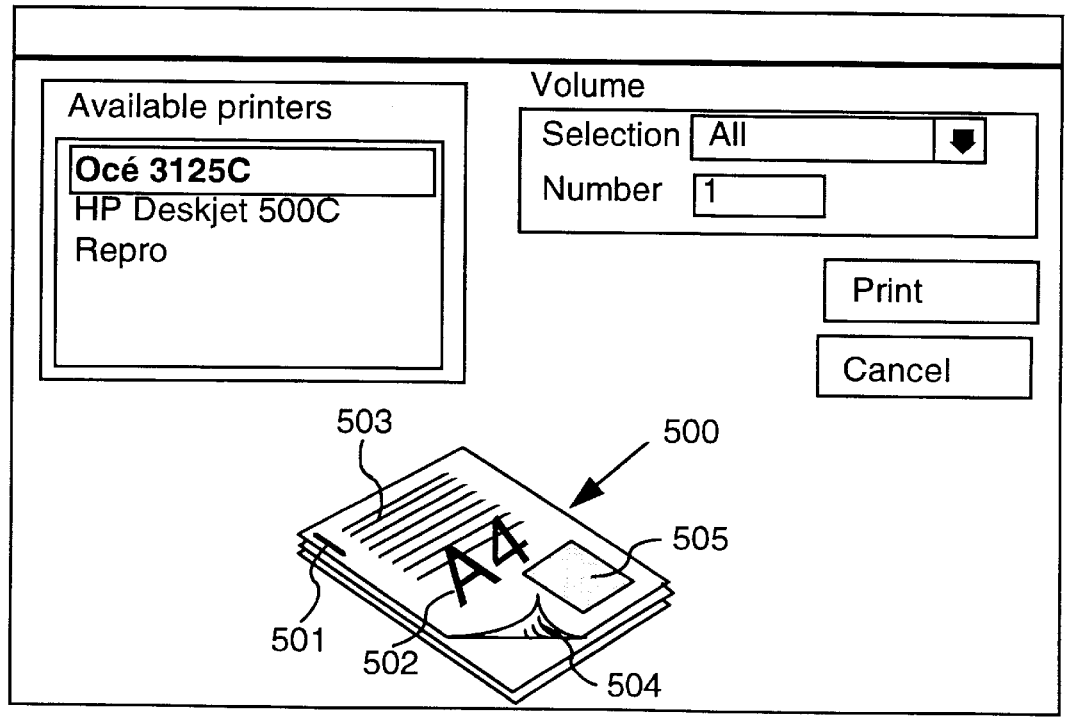
FIG. 5 shows in detail an embodiment of a display unit and control unit in accordance with the invention.

FIG. 5 shows a display of display means of control means in accordance with the invention. A visual representation 500 is shown for a document to be printed and is adapted according to the selection of specific document-finishing operations. In this case, the selected document-finishing operations are CORNER STAPLING in the top left corner (501), printing on A4 format (502), printing in the PORTRAIT mode (503), DUPLEX printing (504) and COLOUR printing (505). The adapted visual representation 500 provides the user with an idea of the end product, as it will be obtained with the selected document-finishing operations.

Selection of a document-finishing operation is effected by activating a specific selection area in the visual representation 500 itself. For example, to select the document-finishing operation: STAPLING, a selection area (not shown in detail in the drawing) around and including the picture of a staple (501) is indicated with a suitable place indicator. The size and shape of the selection areas are so selected that on the one hand they are simple to select and on the other hand overlap as little as possible. Thus, selection of DUPLEX printing is effected by indicating a selection area formed by the visible reverse side of the folded-over corner 504 of the paper. Selection of the (1) sheet format is effected by indicating the area formed and contained by the symbols A4, (2) COLOUR printing by indicating the area formed by the symbolic FIG. 505 and (3) PORTRAIT or LANDSCAPE printing by indicating the area covered by the line pattern 503.

Suitable place indicators include a computer mouse or keyboard controlled cursor, an electronic indicating pen, a touch screen, and so on. If required, and as shown in FIG. 6J a toggle mechanism can also be used, with which the selection areas are activated successively by repeated actuation, for example, of a toggle button, and wherein a specific selection can be made by means of a selection button. In such cases, an activated selection area must be indicated as such by, for example, a different colour or contrast.

Figure 6A:
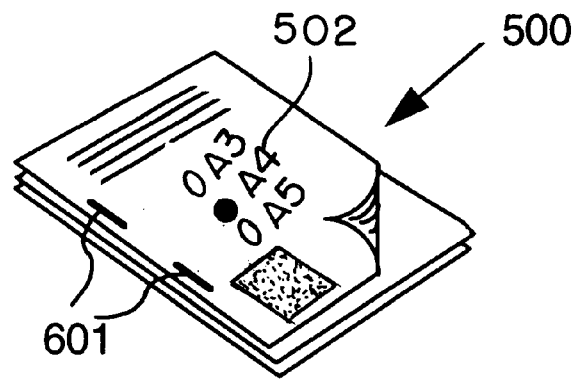

By selecting a selection area associated with a document-finishing operation, for example, by indicating selection with a cursor and actuation of a key or button, the corresponding document-finishing operation is either activated or deactivated, or one possible option of the document-finishing operation is selected. Successive selection, for example, of the selection area 501 will successively result in deactivation of the STAPLING document-finishing operation, in which case there will be no further picture of a staple displayed, or CORNER STAPLING, in accordance with the picture displayed. A subsequent stapling operation, such as SPINE STAPLING 601, is shown in FIG. 6A. The user thus immediately sees the result of his selection since the visual representation 500 is adjusted according to the selection made.

If there are several options possible in the case of a document-finishing operation, it is advantageous not to display the options successively, but to display a list, preferably locally, of these options with the associated selection buttons 502, as shown in FIG. 6A.

It is also advantageous if a document-finishing operation or options thereof which are not to be selected are displayed in a different colour, e.g. light grey, or a different configuration. This prevents a user from searching unnecessarily for an option which is not open to selection. This applies, for example, to a case in which SPINE STAPLING is not possible with a specific printer.

Another embodiment is obtained by simultaneously displaying a number of or all the selectable document-finishing operations, either in a different colour or shading. This is possible, for example, by displaying the various selectable document formats A0 to A5 in dotted lines and the selected document format by an uninterrupted line.

The advantage of this is that a user can see what the selection area is for a specific document-finishing operation and can at once make the proper selection.

In one embodiment, the visual representation is accordingly adapted to a selected printer. The document-finishing operations available for selection with a specific printer are offered for selection in the visual representation 500.

As already stated, the visual representation 500 shown in FIG. 6A differs from a document having the representation 500 shown in FIG. 5 in that the option SPINE STAPLING 601 has been selected from the document-finishing operation: STAPLING instead of CORNER STAPLING 501.

Figure 6B:
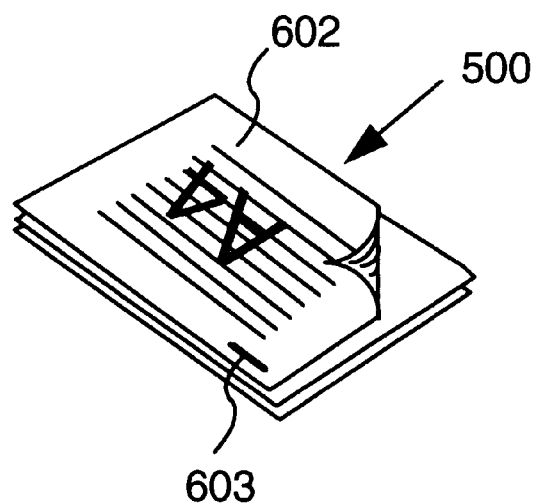

FIG. 6B shows the visual representation 500 for the LANDSCAPE printing document-finishing operation. The line pattern 602 in this case is parallel to the longitudinal direction of the document. Note the stapling position 603 where stapling is effected.

Figure 6C:
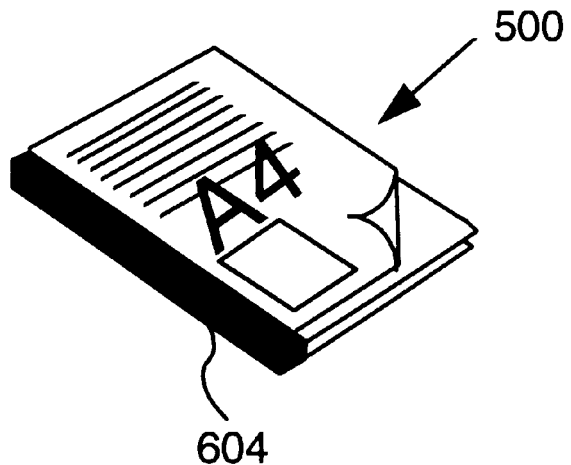

FIG. 6C shows the visual representation 500 when the BINDING document-finishing operation is selected. A binding edge 604 is shown in this case.

Figure 6D:
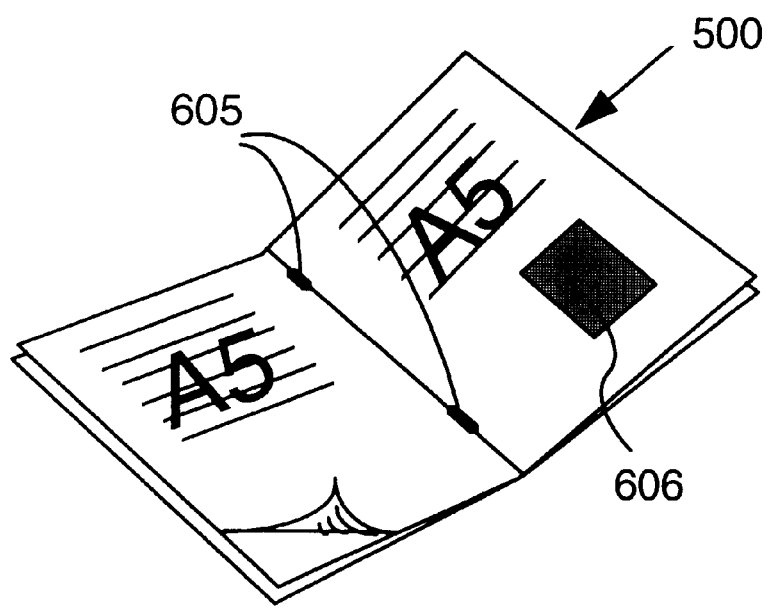

FIG. 6D shows the visual representation 500 on selection of the BOOKLETS printing finishing operation. In this case the SPINE STAPLING option 605 has also been selected and also the finishing operation in which the document is not printed in colour (MONO, 606). In this case the selection area 606 displays a black and white pattern instead of a coloured pattern.

Figure 6E:
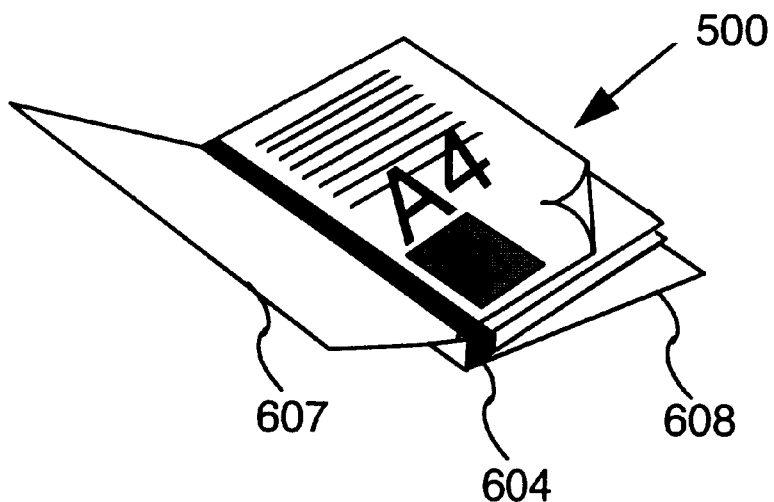

FIG. 6E shows the visual representation 500 in the case in which the BINDING document-finishing operation is selected in combination with the FRONT AND BACK COVERS document-finishing operation. In addition to a binding edge 604, a front cover 607 and a back cover 608 are displayed in this case.

Figure 6F:
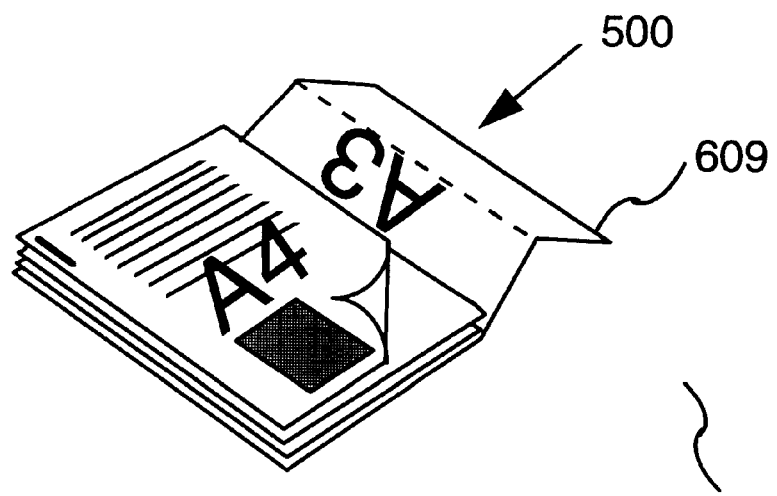

FIG. 6F shows the visual representation 500 in the case of selection of the INSERT PAGE document-finishing operation. In this case it is a page of a different format: A3, instead of A4. A picture 609 of the inserted page in an unfolded state indicates this selection.

Figure 6G:
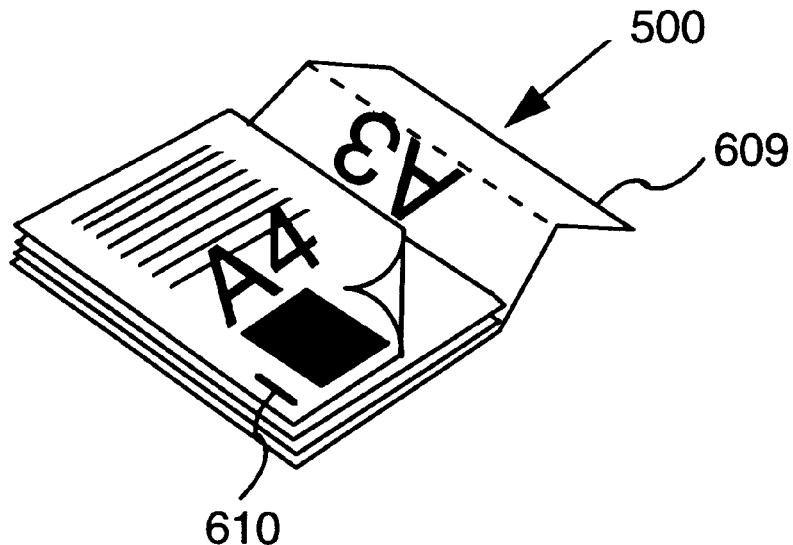

FIG. 6G is a similar representation to FIG. 6F, but in this case there is a different option selected for the STAPLING document-finishing operation, namely BOTTOM CORNER STAPLING. This option is displayed by a picture of the stapling position 610 at the bottom left of the document.

Although the above examples all relate to the finishing of a document consisting of various sheets, a document-finishing operation can also relate to a single sheet. This applies particularly to printing systems for large-format sheets, as is customary, for example, in drawing offices, where it is possible to select different finishing operations for folding a sheet of this kind into a handy format.

Figure 6H:
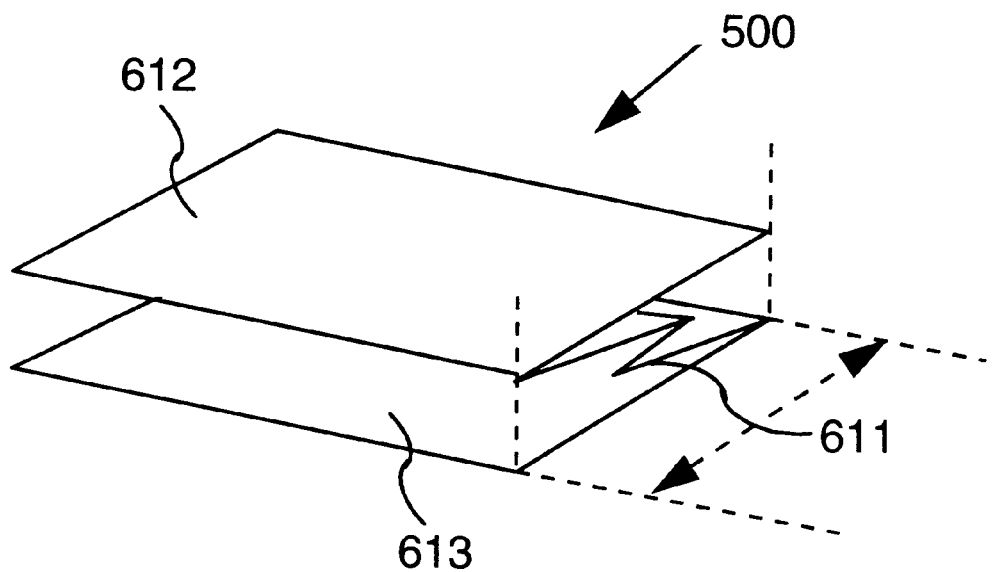

Thus FIG. 6H shows a visual representation 500 of a document which now consists of one sheet, the FOLDING document-finishing operation having been selected. In this case, in addition to an intermediate fold 611 the display shows (via dotted lines) that the size of the top folded part 612 is equal to the size of the bottom folded part 613 and that the edges of these parts coincide.

A different selection for folding is illustrated by the visual representation 500 in FIG. 6I, where the option BINDING EDGE has been selected for the FOLDING document-finishing operation. In this case the top folded part 612 of the document has been given an extra edge 614 intended for binding a document of this kind.

As already stated, the selection of a document-finishing operation or option thereof is effected by selecting a selection area corresponding thereto in a visual representation 500 of a document. In one embodiment, this is effected by indicating a position on the visual representation 500 by a suitable indicator. For example, in the case of FIG. 6I, the option BINDING EDGE is selected by indicating the corresponding part where this binding edge is to be located.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A printing system, comprising:

at least one printer for printing images on at least one sheet in accordance with electrical image signals and control signals fed to said at least one printer;

control means for feeding electrical image signals and control signals to said at least one printer;

input means for receiving and feeding the electrical image signals to said control means, said control means including operating means for generating control signals relating to a document-finishing operation for the at least one sheet to be printed by said at least one printer, and display means for displaying operating information, said operating means adapted to permit an operator to select a document-finishing operation to be effected by the at least one printer on the at least one sheet;

said display means displaying a visual representation on a screen of a sheet or document in accordance with a selected document-finishing operation, said display means displaying the visual representation of a sheet or document in accordance with more than one selectable document-finishing operation, wherein the visual representation is a single adaptable visual representation provided with selection areas which represent selectable document-finishing operations, said operating means selecting a document-finishing operation upon activation of a selection area in the adaptable visual representation, and said display means displaying an updated visual representation of the sheet or document in accordance with the selected document-finishing operation.

2. The printing system according to claim 1, said display means displaying a three-dimensional visual representation of a sheet or a document in accordance with the selected document-finishing operations.

3. The printing system according to claim 1, said operating means including indicating means for activating a selection area by indicating the activation thereof on said display means.

4. The printing system according to claim 2, said operating means including indicating means for activating a selection area by indicating the activation thereof on said display means.

5. The printing system according to claim 3, said display means displaying a list of selectable document operations corresponding to an activated selection area.

6. The printing system according to claim 3, said operating means selecting a document-finishing operation from a number of successively displayed document-finishing operations.

7. The printing system according to claim 1, said display means displaying non-selectable document-finishing operations utilizing a visual representation that is visually distinguishable from selectable document-finishing operations.

8. The printing system according to claim 1, said display means displaying a list of selectable printers, said operating means selecting a printer from the displayed list of selectable printers, said display means displaying a visual representation of a sheet or a document in accordance with the selectable document-finishing operations of the selected printer.

9. The printing system according to claim 1, said display means displaying a list of printers adapted to finishing a sheet or a document in accordance with the displayed document-finishing operations selected via the visual representation thereof.

10. The printing system according to claim 1, wherein the selectable document-finishing operations include simplex printing, duplex printing, stapling, covers, portrait format printing, landscape format printing, colour printing, and black and white printing.

11. A control unit for a printing system having at least one printer, comprising:

an operating unit connected to the at least one printer, said operating unit generating control signals relating to a document-finishing operation for at least one sheet to be printed by the at least one printer; and a display unit connected to said operating unit, said display unit displaying operating information, said operating unit permitting an operator to select a document-finishing operation to be effected by the at least one printer on the at least one sheet, said display unit displaying a visual representation of a sheet or document in accordance with a selected document-finishing operation, said display unit displaying the visual representation of a sheet or document in accordance with more than one selectable document-finishing operation, wherein the visual representation is a single adaptable visual representation provided with selection areas which represent selectable document-finishing operations, said operating unit selecting a document-finishing operation upon activation of a selection area in the adaptable visual representation, and said display unit displaying an updated visual representation of the sheet or document in accordance with the selected document-finishing operation.

12. The control unit according to claim 11, said display unit displaying a three-dimensional visual representation of a sheet or a document in accordance with the selected document-finishing operations.

13. The control unit according to claim 11, said operating unit including an indicating device, said indicating device permitting an operator to activate a selection area by indicating the activation thereof on said display unit.

14. The control unit according to claim 12, said operating unit including an indicating device, said indicating device permitting an operator to activate a selection area by indicating the activation thereof on said display unit.

15. The control unit according to claim 13, said display unit displaying a list of selectable document operations corresponding to an activated selection area.

16. The control unit according to claim 13, said operating unit selecting a document-finishing operation by a repeated activation of the selection area from a number of successively displayed document-finishing operations.

17. The control unit according to claim 11, said display unit displaying non-selectable document-finishing operations utilising a visual representation that is visually distinguishable from selectable document-finishing operations.

18. The control unit according to claim 11, said display unit displaying a list of selectable printers, said operating unit selecting a printer from the displayed list of selectable printers, said display unit displaying a visual representation of a sheet or a document in accordance with the selectable document-finishing operations of the selected printer.

19. The control unit according to claim 11, said display unit displaying a list of printers adapted to finishing a sheet or a document in accordance with the displayed document-finishing operations selected via the visual representation thereof.

20. The control unit according to claim 11, wherein the selectable document-finishing operations include simplex printing, duplex printing, stapling, covers, portrait format printing, landscape format printing, colour printing, and black and white printing.

* * * * *